United States Patent
Gat

(10) Patent No.: US 9,807,198 B2
(45) Date of Patent: *Oct. 31, 2017

(54) METHODS AND SYSTEMS OF IDENTIFYING A DEVICE USING STRONG COMPONENT CONFLICT DETECTION

(71) Applicant: Google Inc., Mountain View, CA (US)

(72) Inventor: Yoram Gat, Tel Aviv (IL)

(73) Assignee: GOOGLE INC., Mountain View, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/831,092

(22) Filed: Aug. 20, 2015

(65) Prior Publication Data

US 2017/0054827 A1    Feb. 23, 2017

(51) Int. Cl.
*G06F 15/173* (2006.01)
*H04L 29/08* (2006.01)

(52) U.S. Cl.
CPC .............. *H04L 67/32* (2013.01); *H04L 67/22* (2013.01)

(58) Field of Classification Search
CPC ................................ H04L 67/32; H04L 67/22
USPC ................... 709/203, 220, 223, 230
See application file for complete search history.

(56) References Cited

U.S. PATENT DOCUMENTS

| | | |
|---|---|---|
| 7,461,120 B1 | 12/2008 | Artz, Jr. et al. |
| 7,657,932 B2 | 2/2010 | Ballinger et al. |
| 7,870,202 B2 | 1/2011 | Madams et al. |
| 8,229,812 B2 | 7/2012 | Raleigh |
| 8,452,881 B2 | 5/2013 | Boubez et al. |
| 8,522,341 B2 | 8/2013 | Nochta et al. |
| 8,528,061 B1 | 9/2013 | Davis |
| 8,621,636 B2 | 12/2013 | Bailey, Jr. |
| 8,847,729 B2 | 9/2014 | Moore et al. |
| 8,984,612 B1* | 3/2015 | Gat ................ H04L 67/306 709/224 |
| 2004/0110172 A1 | 6/2004 | Olson et al. |
| 2009/0276771 A1 | 11/2009 | Nickolov et al. |
| 2009/0288155 A1 | 11/2009 | Joshi et al. |
| 2010/0088364 A1 | 4/2010 | Carter et al. |
| 2010/0100952 A1 | 4/2010 | Sample et al. |
| 2010/0169262 A1 | 7/2010 | Kenedy et al. |
| 2011/0055920 A1 | 3/2011 | Hariri |
| 2011/0125894 A1 | 5/2011 | Anderson et al. |
| 2011/0162038 A1 | 6/2011 | Chunilal |
| 2011/0184993 A1 | 7/2011 | Chawla et al. |

(Continued)

*Primary Examiner* — Michael Y Won
(74) *Attorney, Agent, or Firm* — Fox Rothschild LLP

(57) ABSTRACT

A system implements a method of identifying an electronic device that requests access to a web service. A processor may receive, from an electronic device via a communication network, a first group of requests to access one or more web service functions on behalf of a registered user of the web service. The processor will receive, in connection each of the requests in the first group, one or more data points about the electronic device from which the request originated, will analyze the data points and grouping the requests into a plurality of strong components so that each strong component comprises requests that originate from either a single electronic device or from a plurality of electronic devices having one or more similar properties, and will generate a graph representative of one or more associations between or among the strong components within the grouping.

14 Claims, 7 Drawing Sheets

(56) References Cited

U.S. PATENT DOCUMENTS

| | | |
|---|---|---|
| 2013/0086639 A1 | 4/2013 | Sondhi et al. |
| 2013/0152158 A1 | 6/2013 | Yoshihama |
| 2014/0059647 A1 | 2/2014 | Immonen et al. |
| 2014/0082749 A1 | 3/2014 | Holland et al. |
| 2014/0122223 A1 | 5/2014 | Smith et al. |
| 2014/0298419 A1 | 10/2014 | Boubez et al. |

* cited by examiner

METHODS AND SYSTEMS OF IDENTIFYING A DEVICE USING STRONG COMPONENT CONFLICT DETECTION

BACKGROUND

Web-based service providers often want to identify which devices its users use to access its services. This information can be helpful to service provider in order to, for example, provide better security and properly authenticate or validate access requests.

However, when a service is accessed via a browser, it is sometimes difficult for a service provider to identify the device that is being used. If a user accesses a service using several similar devices such as, for example, several mobile electronic devices, it may be difficult to identify which device is being used on a particular occasion.

While cookies may be used to identify devices, if a cookie cache is cleared or cookies get evicted, web-based service providers often have difficulty identifying a particular device.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In various embodiments, a system implements a method of identifying an electronic device that requests access to a web service. A processor will receive, from an electronic device via a communication network, a first group of requests to access one or more web service functions on behalf of a registered user of the web service. The processor will receive, in connection each of the requests in the first group, one or more data points about the electronic device from which the request originated, and will analyze the data points and grouping the requests into a plurality of strong components so that each strong component comprises requests that originate from either a single electronic device or from a plurality of electronic devices having one or more similar properties. The processor will organize the strong components into one or more groupings based on a shared characteristic, and for each grouping, generate a graph representative of one or more associations between or among the strong components within the grouping. The processor will generate the graph by identifying each strong component within the grouping as a node of the graph, and, for each pair of strong components within the grouping, determining whether a conflict exists, and in response to determining that a conflict exists, adding an edge to the graph that connects the pair of strong components. The processor will identify, based on the edges, one or more sets of strong components, where each set comprises one or more strong components whose data points likely originated from a same electronic device, for each set, assign the nodes associated with the identified strong components within the set a same designation, store characteristics of one or more of the sets in a profile for the registered user, and store the graph in a data store.

Optionally, the processor may receive, from the registered user via a requesting electronic device, an additional request to access one of the more of the web service functions. The processor may analyze the additional request to determine whether the requesting electronic device is one of the devices in the registered user's profile, and upon determining that the requesting electronic device is one of the electronic devices in the user's profile, provide the web service functions of the additional request to the requesting electronic device.

Optionally, the processor may organize the strong components into one or more groupings based on one or more of the following: an operating system, and a device model.

Optionally, the processor may compare one or more data points of a first strong component in the pair to one or more data points of a second component in the pair to determine whether they conflict.

In an embodiment, a processor may use a graph labeling technique to identify a plurality of nodes of the graph that are not connected to one another by an edge, and identify the strong components that correspond to the plurality of nodes as a set. The graph labeling technique may be a graph coloring technique, and the processor may assign the nodes in a same set a same color.

DETAILED DESCRIPTION

Figure 1:
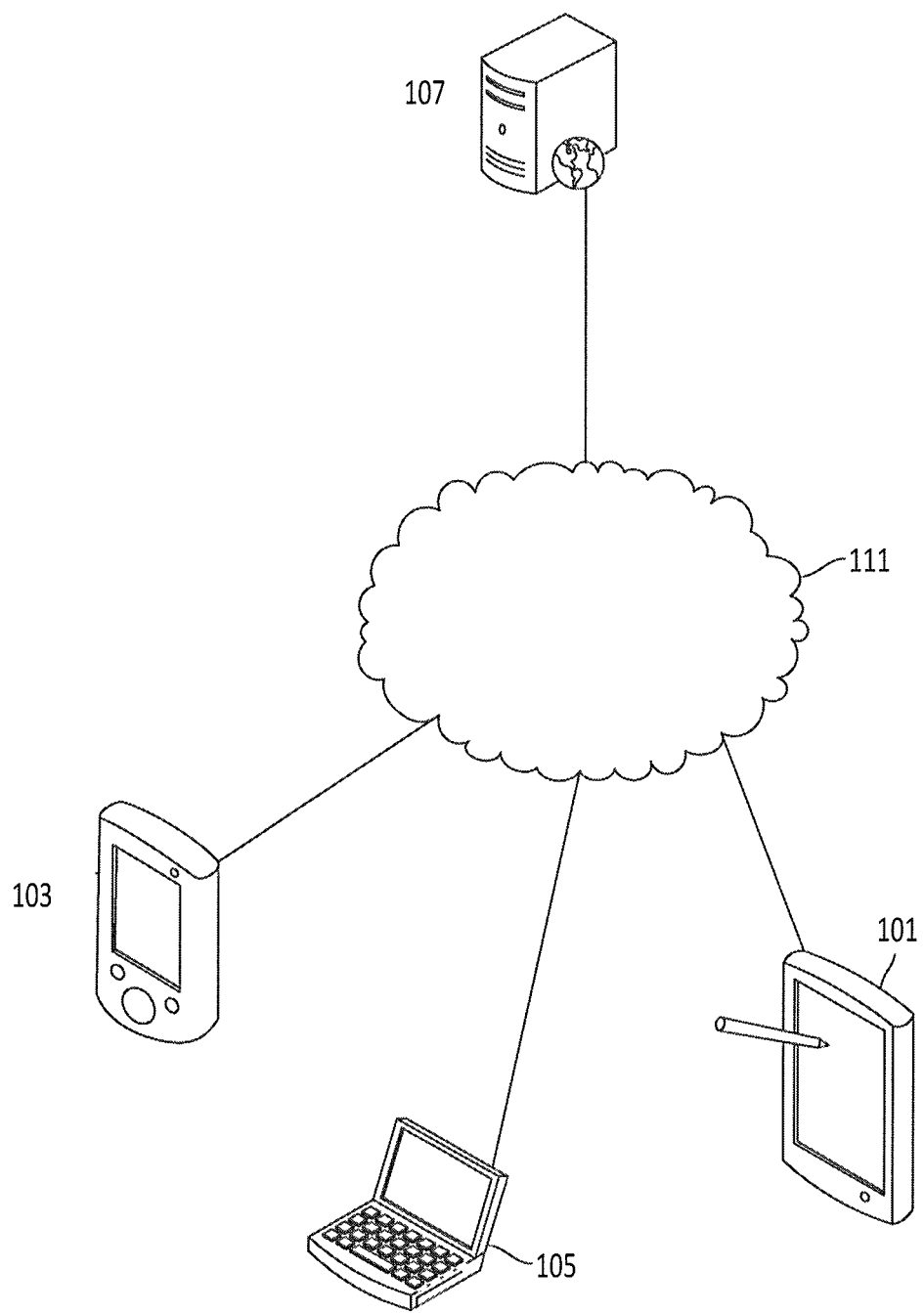
FIG. 1 illustrates example electronic devices according to an embodiment.

The following terms shall have, for purposes of this application, the respective meanings set forth below:

An "authentication credential" is a unique data element or set of data elements that a web service uses to validate a user to the service via one or more client applications on one or more electronic devices. A web service may require each user of the service to have a unique authentication credential, although in some service authentication credentials (or portions of authentication credentials) may be shared by two or more users, such as may be the case in a corporate job sharing arrangement, or an arrangement among family members. Examples of authentication credentials include passwords, username/password combinations, biometric credentials and the like.

A "cookie" refers to a portion of data containing information about a user that is sent by a server associated with a web service to a browser each time a browser accesses a web page from the server.

A "data store" is a set of one or more non-transitory, computer readable memories or memory sectors or portions on which computer-readable data is stored.

An "electronic device" is a device that includes a processor and non-transitory computer-readable memory. The memory contains programming instructions in the form of a software application that, when executed by the processor, causes the device to perform various operations according to the programming instructions. Examples of electronic devices include smartphones, personal digital assistants, cameras, tablet devices, electronic readers, personal computers, media players, satellite navigation devices and the like.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

A "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments.

A "web service" is a function or set of functions that can be accessed by an electronic device over a communications network (such as the World Wide Web) via a communications protocol such as hypertext transfer protocol. Examples of web services functions include, without limitation, e-commerce websites, streaming media services, social media applications, mail and other messaging services, cloud-based storage systems and other services. A "web service provider" is an entity that makes one or more web services available to registered users.

FIG. 1 shows several electronic devices that may be used in the context of the discussion below. Any number of user electronic devices 101, 103 and 105 will include communication components that enable each device to communicate with a remote web service provider electronic device 107 via one or more communication networks 111. As shown, the user electronic devices may include, for example, a smartphone 101; a laptop, desktop or notebook computer 103; a tablet computer 105; or any other type of electronic device on which one or more browsers or other client applications are installed. However, each component may be any suitable electronic device, such as those described in more detail below. It is only required that all electronic devices associated with a particular user have installed a common type of client application, such as a browser. The actual applications need not be identical. For example, different devices may include different browser versions based on release date, operating system or device used, or other criteria.

The web service provider 107 also includes one or more electronic devices that make a web service accessible to the remote electronic devices. For example, the web service provider may host one or more web pages that are made available to remote user device. At least some of the web pages will be secure web pages having content that may only be accessed by an authorized user's device. The security of at least some of the pages may be implemented by encryption keys, passcodes or other authentication schemes. In addition, in some embodiments, the web service provider makes multiple web services available. Examples of multiple services may include a mail service, a social network and a file storage service. In such embodiments, when a device is authenticated to one of the available web services, the web service provider may automatically consider the device to authenticated to one or more of the additional services without requiring the device to provide any further authentication credentials or actions.

Figure 2:
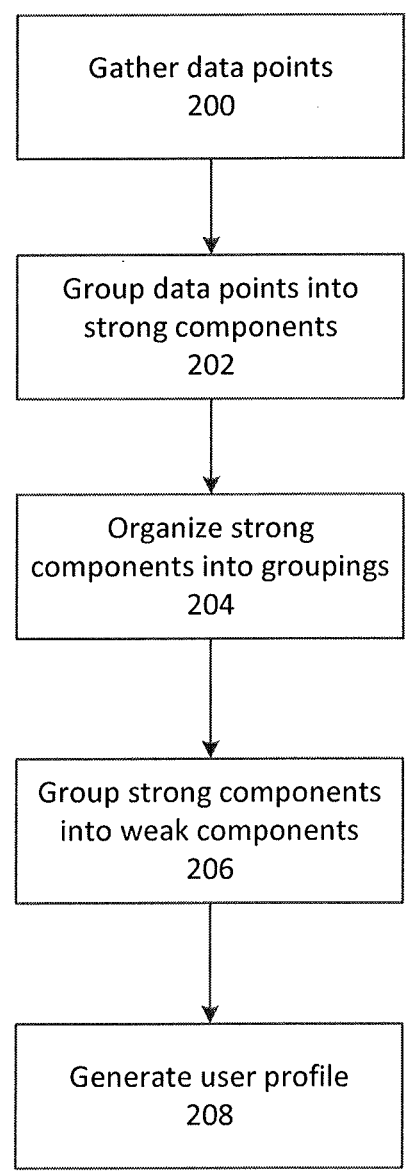
FIG. 2 illustrates a flowchart of example steps that a web service provider may implement to identify an electronic device from which a user's request originates according to an embodiment.

FIG. 2 is a flowchart illustrating steps that a web service provider may implement to identify the electronic device from which a user's request originates. As illustrated by FIG. 2, a web service provider electronic device may gather 200 one or more data points about one or more devices that are accessing a service. In an embodiment, data points may include authentication credentials. When a user first uses any electronic device's client application to access the web service, the web service provider may require the user to provide authentication credential. Once the user provides the authentication credential, the web service provider electronic device will compare the credential to a set of known credentials to determine if the user is a registered user of the web service. If the credential is known, then the web service provider will determine that the user is a registered user and will begin a session in which the client application can access one or more features of the web service.

Thereafter, when a web service provider electronic device receives an additional request from the same user to access the web service, the web service provider will also receive (in connection with the request) one or more data points about the device from which the request originated. The data points may include one or more general characteristics of the device such as an operating system type and/or version, a device model, a screen resolution of the device, one or more token records, server records, cookies and/or the like.

The web service provider electronic device will analyze one or more of the data points for each request and group 202 the requests into clusters so that each cluster comprises requests that originate from either a single electronic device or from multiple electronic devices having similar characteristics. For example, the web service provider electronic device may cluster all requests that originated from devices having the same operating system, the same screen resolution, the same device model, the same application versions, other characteristics, or any combination of these characteristics.

In an embodiment, a web service provider electronic device may group 202 requests that have a high likelihood of originating from the same electronic device into a cluster. For example, requests that share credentials or cookies are likely to originate from the same electronic device, and therefore a web service provider may group 202 these data points in a cluster. A cluster of requests that have a high likelihood of originating from the same electronic device is referred to throughout this disclosure as a strong component. In various embodiments, a single electronic device may be the origin of multiple strong components.

Figure 3:
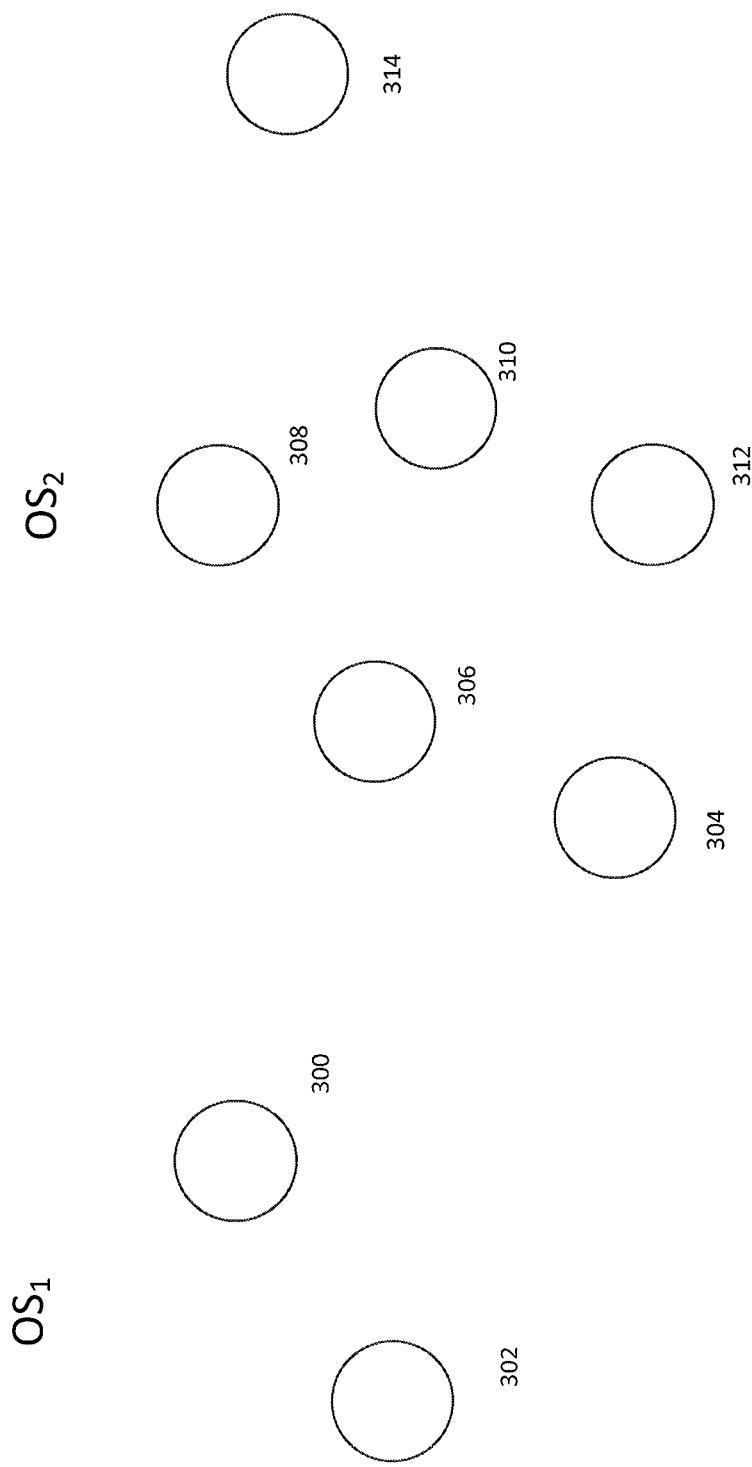
FIG. 3 illustrates example strong components according to an embodiment.

A web service provider electronic device may organize 204 one or more strong components into one or more groupings based on a characteristic of an electronic device that is shared by each request of a strong component. Example characteristics may include, without limitation, an operating system, a device model and/or the like. For instance, FIG. 3 illustrates example strong components that are organized into two groupings by operating system. As illustrated in FIG. 3, strong components 300, 302 in a first grouping correspond to Operating System 1 (OS1), and strong components 304, 306, 308, 310, 312, 314 in a second grouping correspond to Operating System 2 (OS2).

In various embodiments, a web service provider electronic device may analyze one or more of the strong components and group 206 the strong components into one or more clusters which aim to correspond to electronic devices. A group or set of strong components is referred to throughout this disclosure as a weak component. In an embodiment, a web service provider electronic device may group 206 strong components into one or more weak components by using graph analysis according to an embodiment.

Each node of a graph may represent a strong component, and each edge of a graph may represent a conflict between a pair of strong components. A conflict may refer to one or more conflicting data points that make it impossible, or at least unlikely, that the data points of the connected strong components originated from the same electronic device. For instance, referring to FIG. 3, strong component 306 may originate from a device having Device Model A, while strong component 308 may originate from a device having Device Model B. As such, the data points of these strong components 306, 308 cannot have originated from the same device and may be connected by an edge.

Figure 4:
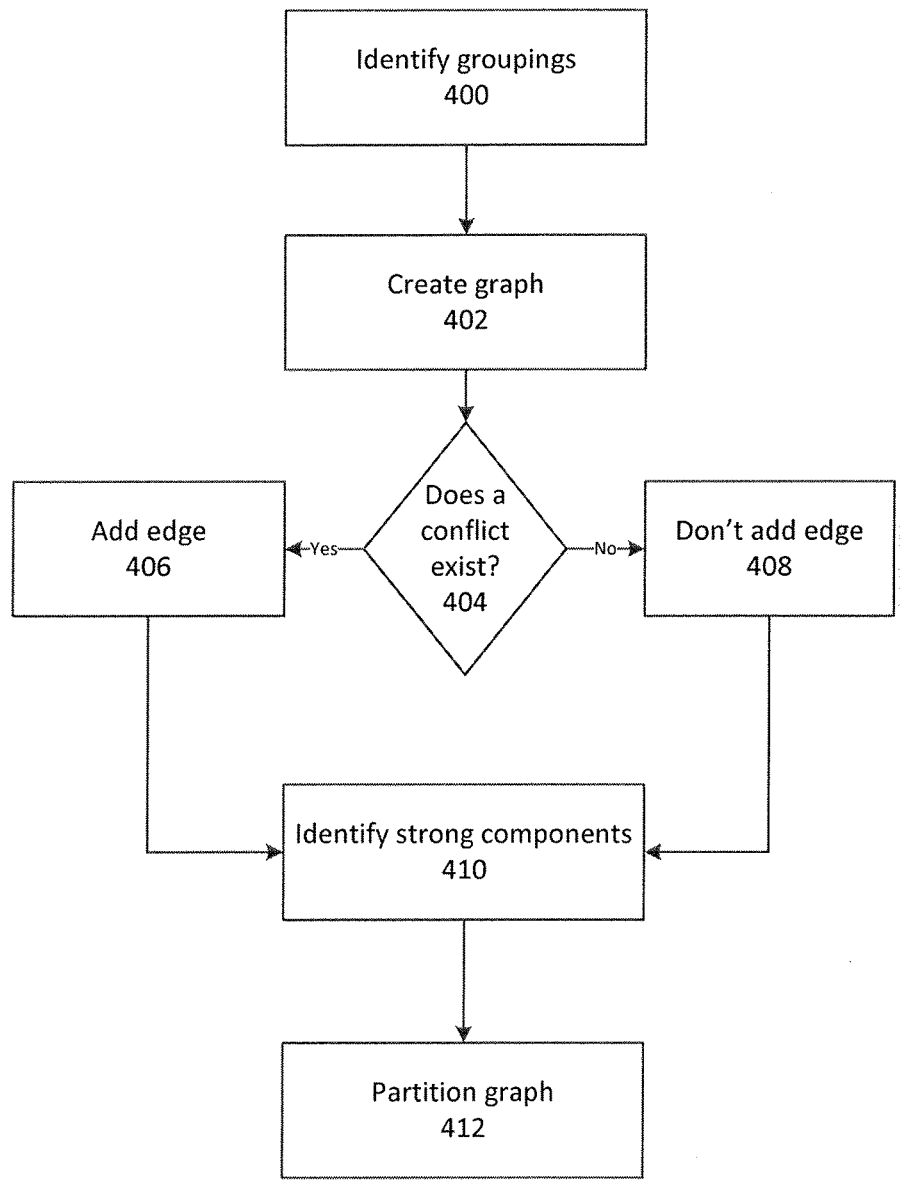
FIG. 4 illustrates a flow chart of an example method of graph analysis according to an embodiment.

FIG. 4 illustrates a flow chart of an example method of graph analysis according to an embodiment. As illustrated by FIG. 4, a web service provider electronic device may identify 400 one or more groupings of strong components. The web service provider electronic device may create 402 a graph for one or more of the groupings where each strong component in the grouping represents a node in the graph.

For one or more pairs of strong components in a grouping, a web service provider may compare one or more data points corresponding to the strong components to determine 404 whether a conflict exists. As discussed above, a conflict may exist if one or more data points of the pair strong components indicate that it is unlikely that the data points of the strong components originated from the same electronic device. A conflict between two strong components may result from an operating system mismatch, a device identifier mismatch, a cookie scheduling conflict, a timeline version conflict, a screen resolution mismatch, a device model mismatch and/or the like.

If a web service provider electronic device determines 404 that a conflict exists between a pair of strong components, the web service provider electronic device may cause 406 an edge to be added to the graph between the nodes that are representative of the strong component pair. If a web service provider electronic device determines 404 that a conflict exists between a pair of strong components, the web service provider electronic device may cause 408 an edge not to be added to the graph between the nodes that are representative of the strong component pair.

Figure 5:
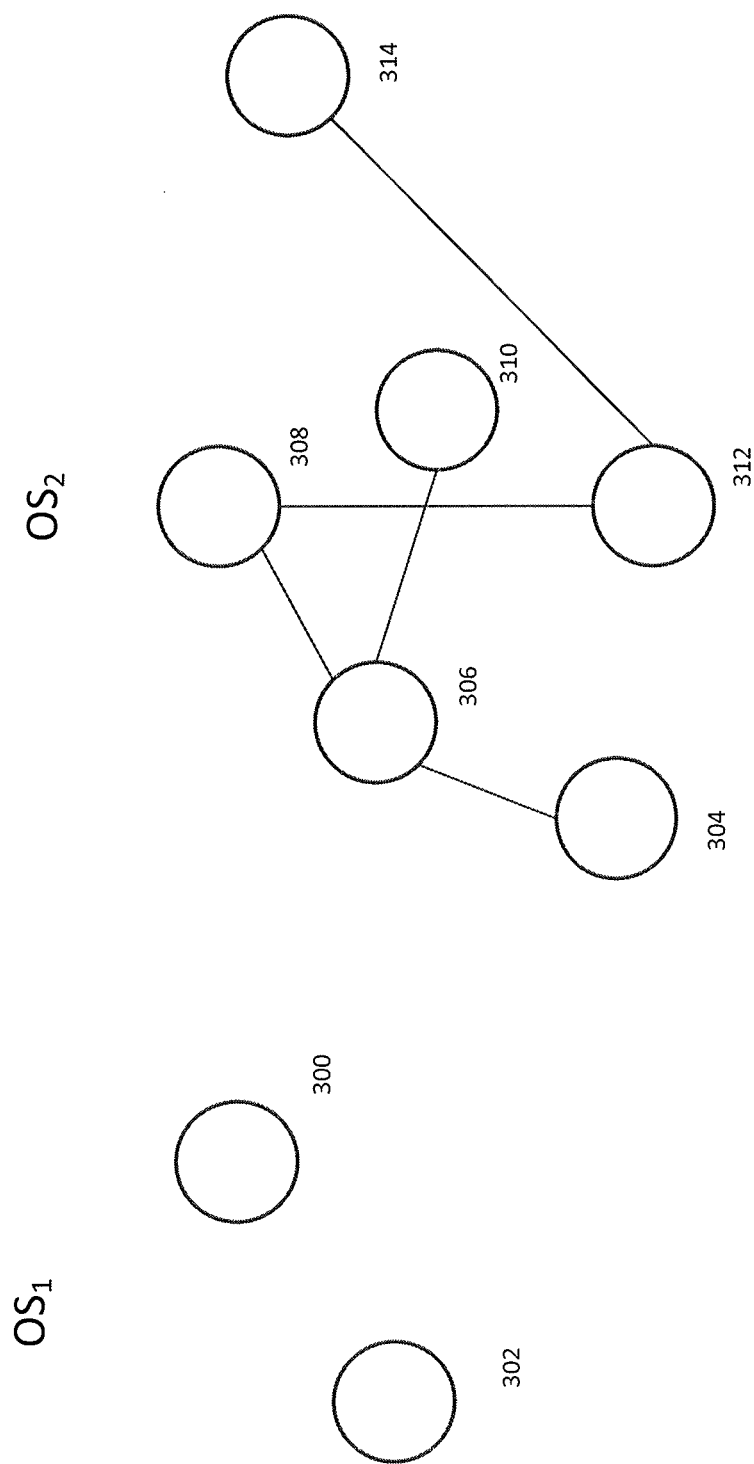
FIGS. 5 and 6 illustrate example graphs according to various embodiments.

For instance, FIG. 5 illustrates an example graph corresponding to the strong components illustrated in FIG. 3. As illustrated in FIG. 5, strong components 302, 304 do not have an edge between them, so it is possible that data represented by these strong components originated from the same electronic device. In comparison, edges exist between strong component pairs {304, 306}, {306, 308}, {306, 310}, {308, 312} and {312, 314} meaning that it is unlikely that the data represented by each of these pairs of strong components originated from the same electronic device.

In an embodiment, a web service provider electronic device may identify 410 one or more strong components that are associated with data that likely originated from the same electronic device. A web service provider electronic device may identify 410 one or more strong components by determining one or more nodes from a graph that are not connected by an edge. In an embodiment, a web service provider electronic device may identify 410 one or more strong components within the same grouping. For example, referring to FIG. 5, a web service provider electronic device may identify strong components 304, 308, 310 and 314 as being associated with data that likely originated from the same electronic device because these nodes are not connected to one another with an edge.

In an embodiment, a web service provider electronic device may partition 412 a graph and may cause a representation of this association to be assigned to the graph. In certain embodiment, a web service provider electronic device may partition 412 a graph into one or more weak components using a graph labeling technique such as, for example, graph coloring. Graph coloring involves the assignment of indicators or colors to elements of a graph such as, for example, vertices, subject to certain constraints. Such graph coloring techniques are well known in the art, and may be used to partition a graph into one or more components that are distinguishable by color. The resulting partition is such that no two nodes in the graph that are connected by an edge are colored by the same color. As a result, two strong components that are in conflict will not be assigned to the same weak component.

Figure 6:
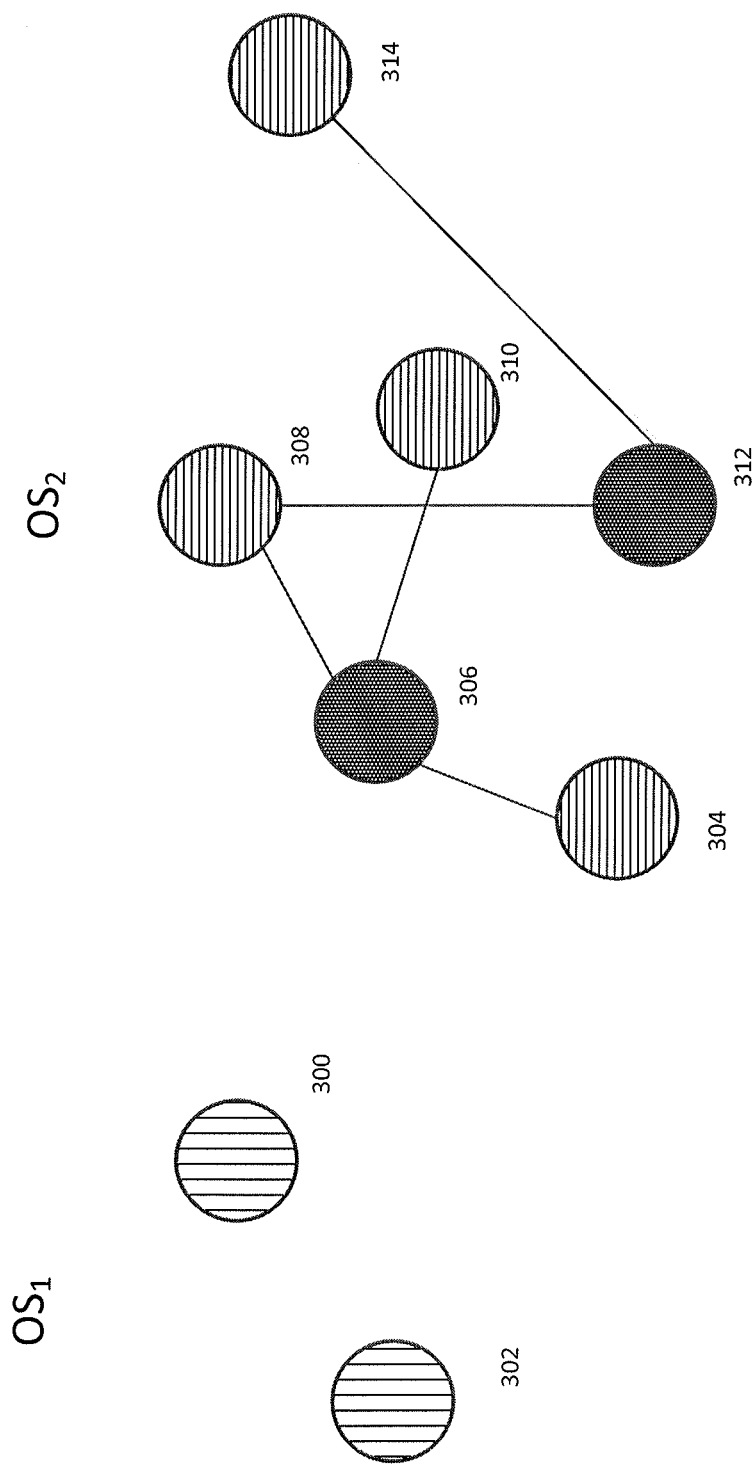

For example, a web service provider electronic device may cause nodes representative of data that likely originated from the same electronic device to be similarly colored, shaded, or applied with the same pattern or texture such as, for example, hash lines, dots, stripes and/or the like. For example, as illustrated in FIG. 6, the nodes representing strong components 300, 302 both have vertical striping, the nodes representing strong components 306, 312 both include a dotted pattern, and the nodes representing strong components 304, 308, 310, and 314 have horizontal striping. Additional and/or alternate patterns, colors, shadings, textures, etc. may be used within the scope of this disclosure. A web service provider electronic device may partition 412 the graph and cause a representation of this association to be assigned using one or more graph labeling techniques, such as, for example, one or more graph coloring techniques. In various embodiments, a web service provider electronic device may store one or more graphs in a data store.

When a web service provider receives an additional request from a registered user via a requesting device, the web service provider will determine whether the analyzed data points are sufficient to identify the requesting device as a known device for the requesting user using the created graph. If the device is a known device, the web service provider will provide the requested function to the user's requesting device. If not, it will cause a client application from which the additional request originated to generate a prompt to provide an additional authentication credential; and it will only provide the additional request's web service functions to the requesting device after the web service provider receives the additional authentication credential.

In various embodiments, a web service provider may generate 208 a user profile for a user. The user profile may include characteristics of one or more electronic devices associated with the user. For instance, a user profile may include information pertaining to one or more strong components, one or more weak components, one or more groupings, a generated graph and/or the like. A web service provider may use this information to identify one or more electronic devices that the user typically uses.

In certain embodiments, as a web service provider receives additional data points or requests, a web service provider electronic device may perform at least a portion of steps 200-208 to update relationships, associations, a graph configuration and/or a user profile.

As described above, a request will typically include one or more parameters of the requesting device. These may include, for example, a screen resolution, operating system version, or the like. In some embodiments, the web service provider may compare these parameters to characteristics of devices in a registered user's profile to find a match and thus determine which of the electronic devices in the registered user's profile submitted the request. The system may then use the characteristics of the matched electronic device to select a parameter for the web service function. Then, when providing the web service functions of the additional request to the requesting device, the system will deliver the web service function with the selected parameter. For example, the system may use the screen resolution to deliver a photo sharing service with photos of a resolution that corresponds to the device's screen resolution.

Figure 7:
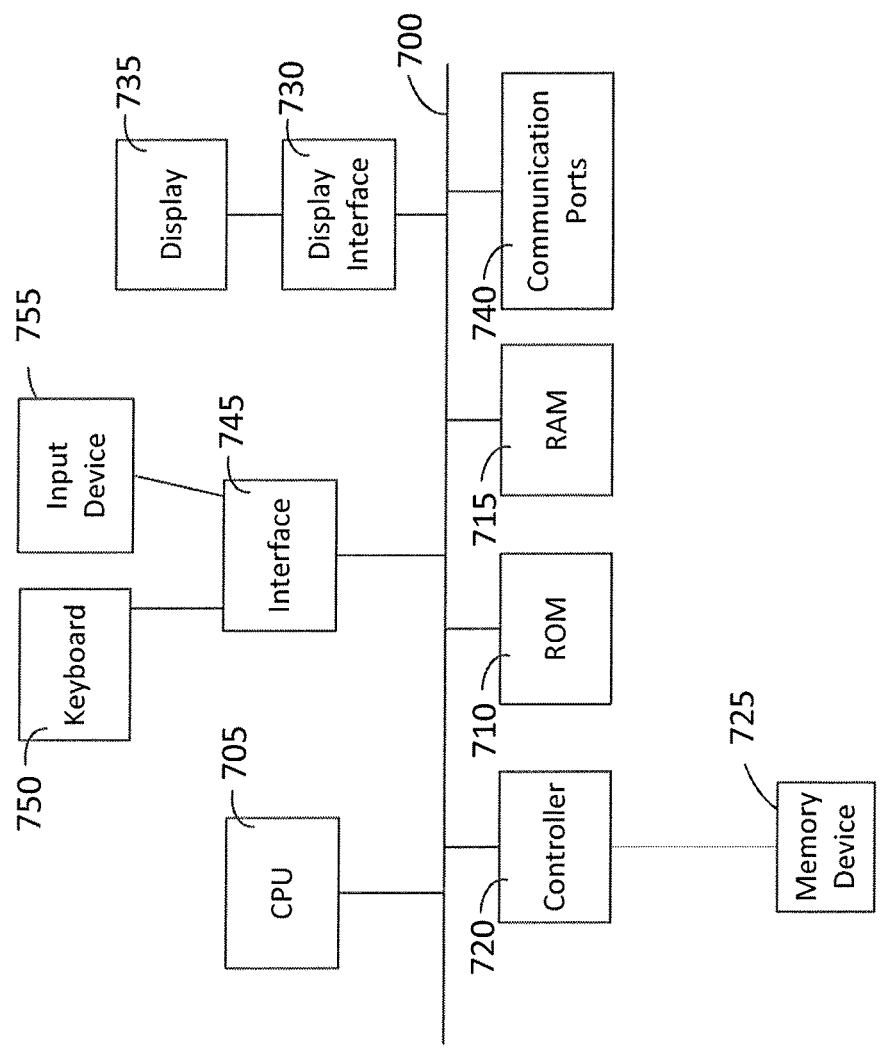
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a production device, computing device or processor as such terms are used within this disclosure. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communication network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of identifying an electronic device that requests access to a web service, comprising:
by one or more processors of a provider of a web service:
receiving, from one or more electronic devices of a registered user of the web service via a communication network, a first group of requests to access one or more web service functions,
receiving, in connection each of the requests in the first group, one or more data points about an electronic device from which the request originated,
analyzing the data points and grouping the requests into a plurality of strong components so that each strong component comprises requests that originate from either a single electronic device or from a plurality of electronic devices having one or more similar properties,
organizing the strong components into one or more groupings based on a shared characteristic,
for each grouping, generating a graph representative of one or more associations between or among the strong components within the grouping by:
identifying each strong component within the grouping as a node of the graph,
for each pair of strong components within the grouping:
determining whether a conflict exists, and
in response to determining that a conflict exists, adding an edge to the graph that connects the pair of strong components,
identifying, based on the edges, one or more sets of strong components, wherein each set comprises one or more strong components whose data points likely originated from a same electronic device,
for each set, assigning the nodes associated with the identified strong components within the set a same designation,
storing characteristics of one or more of the sets in a profile for the registered user, and
storing the graph in a data store.

2. The method of claim 1, further comprising:
receiving, from the registered user via a requesting electronic device, an additional request to access one of the more of the web service functions;
analyzing the additional request to determine whether the requesting electronic device is one of the electronic devices in the registered user's profile; and
upon determining that the requesting electronic device is one of the electronic devices in the user's profile, providing the web service functions of the additional request to the requesting electronic device.

3. The method of claim 1, wherein organizing the strong components into one or more groupings based on a shared characteristic comprises organizing the strong components into one or more groupings based on one or more of the following:
an operating system; and
a device model.

4. The method of claim 1, wherein determining whether a conflict exists comprises comparing one or more data points of a first strong component in the pair to one or more data points of a second component in the pair to determine whether they conflict.

5. The method of claim 1, wherein identifying, based on the edges, one or more sets of strong components comprises using a graph labeling technique to:
identify a plurality of nodes of the graph that are not connected to one another by an edge; and
identify the strong components that correspond to the plurality of nodes as a set.

6. The method of claim 5, wherein using a graph labeling technique comprises using a graph coloring technique.

7. The method of claim 6, further comprising assigning the nodes in the set a same color.

8. A web service provider system, comprising:
a processor; and
a computer-readable storage medium comprising one or more programming instructions configured to cause the processor to:
receive, from an electronic device via a communication network, a first group of requests to access one or more web service functions on behalf of a registered user of the web service,
receive, in connection each of the requests in the first group, one or more data points about the electronic device from which the request originated,
analyze the data points and grouping the requests into a plurality of strong components so that each strong component comprises requests that originate from either a single electronic device or from a plurality of electronic devices having one or more similar properties,
organize the strong components into one or more groupings based on a shared characteristic,
for each grouping, generate a graph representative of one or more associations between or among the strong components within the grouping by:
identifying each strong component within the grouping as a node of the graph,
for each pair of strong components within the grouping:
determining whether a conflict exists, and
in response to determining that a conflict exists, adding an edge to the graph that connects the pair of strong components,
identifying, based on the edges, one or more sets of strong components, wherein each set comprises one or more strong components whose data points likely originated from a same electronic device,
for each set, assigning the nodes associated with the identified strong components within the set a same designation,
storing characteristics of one or more of the sets in a profile for the registered user, and
storing the graph in a data store.

9. The web service provider system of claim 8, further comprising additional programming instructions configured to cause the processor to:
receive, from the registered user via a requesting electronic device, an additional request to access one of the more of the web service functions;
analyze the additional request to determine whether the requesting electronic device is one of the devices in the registered user's profile; and
upon determining that the requesting electronic device is one of the electronic devices in the user's profile, provide the web service functions of the additional request to the requesting electronic device.

10. The web service provider system of claim 8, wherein the programming instructions that are configured to cause the processor to organize the strong components into one or more groupings based on a shared characteristic comprise one or more programming instructions that are configured to cause the processor to organize the strong components into one or more groupings based on one or more of the following:
an operating system; and
a device model.

11. The system of claim 8, wherein the programming instructions that are configured to cause the processor to determine whether a conflict exists comprise one or more programming instructions that are configured to cause the processor to compare one or more data points of a first strong component in the pair to one or more data points of a second component in the pair to determine whether they conflict.

12. The system of claim 8, wherein the programming instructions that are configured to cause the processor to identify, based on the edges, one or more sets of strong components comprise one or more programming instructions that are configured to cause the processor to use a graph labeling technique to:
identify a plurality of nodes of the graph that are not connected to one another by an edge; and
identify the strong components that correspond to the plurality of nodes as a set.

13. The system of claim 12, wherein the programming instructions that are configured to cause the processor to use a graph labeling technique comprise one or more programming instructions that are configured to cause the processor to use a graph coloring technique.

14. The system of claim 13, further comprising additional programming instructions configured to cause the processor to assign the nodes in the set a same color.

* * * * *